United States Patent [19]
Palombo et al.

[11] 3,909,734
[45] Sept. 30, 1975

[54] REFERENCE SIGNAL GENERATOR, PARTICULARLY FOR THE CONTROL OF A DIRECT-CURRENT MOTOR

[75] Inventors: Gaston Albert Palombo; Andre Achille Brecy, both of Danjoutin, France

[73] Assignee: Compagnie Honeywell Bull, Paris, France

[22] Filed: Dec. 3, 1973

[21] Appl. No.: 420,986

[30] Foreign Application Priority Data
Dec. 21, 1972 France .................. 72.45759

[52] U.S. Cl. .............. 328/181; 307/261; 318/163; 318/342; 318/345; 328/35; 328/184; 328/185
[51] Int. Cl.² ... H03K 4/12; H03K 4/90; H02P 5/06; H02P 7/06
[58] Field of Search ............... 307/261, 263, 264; 318/342, 345, 163, 504, 505; 328/35, 151, 172, 173, 175, 181, 183, 184, 185

[56] References Cited
UNITED STATES PATENTS

| | | | |
|---|---|---|---|
| 3,304,506 | 2/1967 | Weekes | 328/151 |
| 3,405,286 | 10/1968 | Mudie | 328/181 X |
| 3,411,062 | 11/1968 | Kamens | 318/345 X |
| 3,525,916 | 8/1970 | Chodash | 318/345 |
| 3,614,571 | 10/1971 | Koch | 318/345 |
| 3,683,252 | 8/1972 | Maynard | 318/345 X |
| 3,745,373 | 7/1973 | Jones | 328/181 X |
| 3,745,436 | 7/1973 | Buttafava | 318/345 X |
| 3,826,961 | 7/1974 | Hayase et al. | 318/345 X |

OTHER PUBLICATIONS
Benson, "Temperature Compensation for Sample and Hold Circuit"; IBM Tech. Discl. Bull.; Vol. 9, No. 5, pp. 476–477, 10/1966.
Millman et al., "Electronic Devices and Circuits", pp. 359–362; McGraw-Hill Book Co., 1967.

*Primary Examiner*—John S. Heyman
*Assistant Examiner*—L. N. Anagnos
*Attorney, Agent, or Firm*—David A. Frank; Ronald T. Reiling

[57] ABSTRACT

A reference-signal generator, particularly for the control of a direct-current motor, comprising a regulated voltage source supplying one of the inputs of a fast and sensitive comparator whose output is connected by resistive means to an integrator-connected operational amplifier, the output of which is connected to the other input of said comparator.

7 Claims, 6 Drawing Figures

REFERENCE SIGNAL GENERATOR, PARTICULARLY FOR THE CONTROL OF A DIRECT-CURRENT MOTOR

BACKGROUND

1. Field of Invention

The present invention concerns a reference-signal generator, particularly for the control of a direct-current motor.

2. Prior Art

It is known that to control a speed-regulated direct-current motor, it is necessary to provide a reference-voltage generator whose signal representing the desired speed of the motor is compared continuously with a signal representing the instantaneous speed of said motor. Such a generator must furnish a precise reference voltage.

For that purpose, there is already known a generator of this type comprising an integrator whose capacitor is shunted by Zener diode. However, such a generator exhibits many problems. First of all, it does not permit regulation of the amplitude of the plateau of the delivered voltage. Moreover, it rounds off the transition between the ascending and descending flanks and the plateaus of the signal that it delivers, which does not permit a precise control of the motor. Finally, the minimum and maximum plateaus have a very imprecise amplitude because the drift of a Zener diode can reach 10% of the voltage at its terminals.

The present invention remedies these disadvantages.

OBJECTS

It is a primary object of the invention to provide an improved reference-signal generator.

A more specific object of the invention is to provide an improved control of a direct-current motor.

Still a further object is to provide voltages of precise levels joined by precise ramps.

SUMMARY OF THE INVENTION

According to the invention, this reference-signal generator, particularly for the control of a direct-current motor, is notable in that it comprises a regulated voltage source supplying one of the inputs of a fast and sensitive comparator whose output is connected by resistive means to an integrator-connected operational amplifier, the output of said amplifier being connected to the other input of said comparator.

Thus, the voltage at the output of the operational amplifier, which also forms the output of the generator, follows the variation of the regulated voltage put out by said source and makes it possible to furnish voltages of precise levels joined by precise ramps.

Preferably, the regulated voltage source is of the pulse-controlled type, while the regulated votage is transmitted to the comparator via a resistive bridge so that the voltages of establishment and disappearance of the regulated voltage in said bridge are transformed respectively into ascending and descending linear ramps of the generator signal and so that the equilibrium voltage of said regulated voltage in said bridge give rise to plateaus for said generator signal. Said control pulses for the regulated voltage source are advantageously square pulses whose duration, number and frequency can be modified. Thus, the direct-current motor can be fed by a constant voltage or else by consecutive or isolated steps.

Since the integration time constant is formed by the capacitor connected with negative feedback to the operational amplifier and by the resistive means of connection between the comparator and the latter, these resistive means comprise at least one potentiometer capable of varying said integration constant. Likewise, the resistive bridge arranged between the regulated voltage source and the comparator can comprise a variable element to modify the amplitude of the plateaus of the generator output signal.

A filter is advantageously arranged in the connection between the output of the operational amplifier and the other input of the comparator.

The comparator is advantageously of the two-channel transistorized differential amplifier type in which the emitter-collector paths of the amplifier transistors comprise a constant-current generator. It can comprise two emitter-follower-connected input stages, each associated with one of said channels, with a constant-current generator also being connected in the emitter-collector path of the transistors of said input stages.

Such very fast comparators exist in the trade in the form of integrated circuits, and their drift is less than 7.5 mV, independently of their input voltage. Consequently, the precision of the generator's output signal can be very large.

The generator according to the invention is particularly appropriate, although not exclusively, for the control of direct-current motors of printing machines in which it is necessary either to drive the printing types at constant speed, or to drive the printing paper step by step, or to rearm the striking hammers by tightening a spring, the tightening being effected by rotating the spindle of said hammers by one turn.

BRIEF DESCRIPTION OF THE DRAWINGS

The Figures of the appended drawing make well evident how the invention can be implemented.

In these Figures, identical reference symbols designate similar elements.

DETAILED DESCRIPTION OF THE PREFERRED EMBODIMENT

Figure 1:
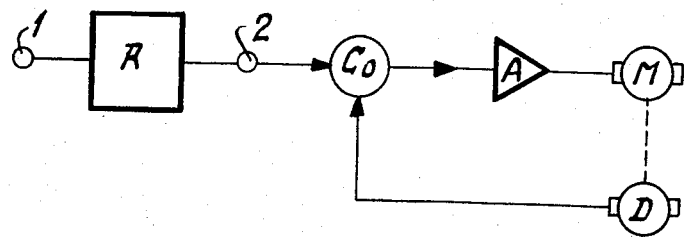
FIG. 1 is a schematic view of a known control mechanism in which the reference signal generator according to the invention can be used.
Figure 2:
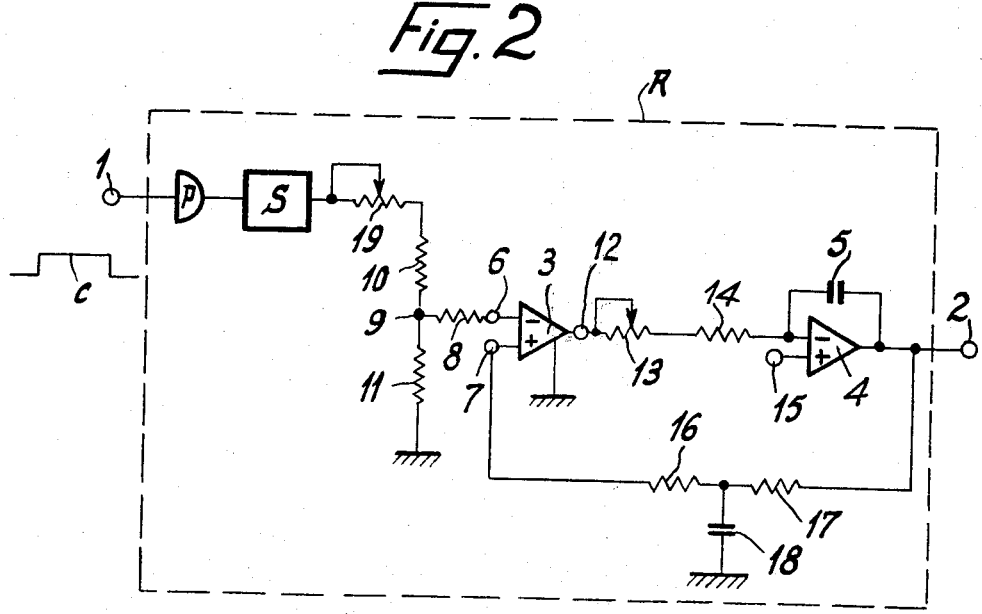
FIG. 2 shows a synoptic diagram of a generator according to the invention.

The speed control diagram of a direct-current motor M shown in FIG. 1 is well known. It comprises a tachometric dynamo D driven by the motor M and delivering a signal representing the instantaneous speed of the latter. This signal is compared in a comparator $C_o$ to a reference signal originating from the output 2 of a generator R controlled by its input 1, this reference signal representing the desired speed for the motor M. The error signal emitted by the comparator $C_o$ is transmitted to an amplifier A which supplies the motor M.

Figure 3:
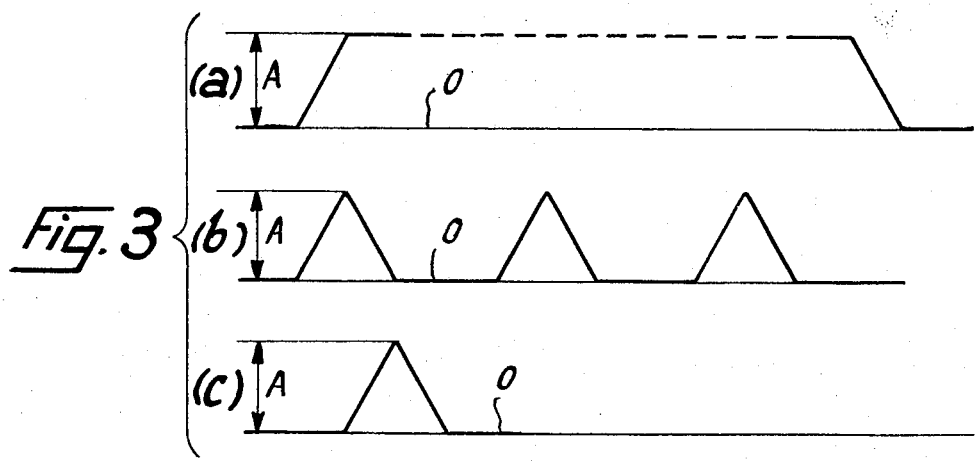
FIGS. 3a, 3b and 3c show examples of signals emitted by the generator of FIG. 2.

The object of the present invention concerns the reference generator R. Starting from square control signals c applied to the input terminal 1, the generator must be capable of furnishing, at the output 2, very precise signals corresponding respectively to the drive of the spindle of motor M at constant speed (FIGS. 3a), to the drive of the spindle of motor M step by step (FIG. 3b) or to a rotation of determined amplitude (for example, one turn) of said spindle (FIG. 3c). Thus, it is particularly important that the zero level of these signals be specified precisely in order to prevent any accidental rotation of the spindle when it is thought to be at rest, and that the same hold true for the maximum amplitude A of said signals in order to obtain the desired precision for the amplitude of rotation of the spindle of motor M. The linear flanks must also be precise in order to obtain good precision in the acceleration and deceleration of the motor.

For that purpose, according to the invention, the generator R comprises the combination of a comparator 3 and an integrator formed in known manner by an operational amplifier 4 shunted by a capacitor 5. One of the inputs 6 of the comparator 3 is connected via a resistance 8 to the common point 9 of a resistive divider bridge 10, 11, one of whose ends is grounded, while the other end of said bridge is fed by a regulated-voltage source S controlled from terminal 1 across a gate P.

The output 12 of the comparator 3 is connected to one of the inputs of the operational amplifier 4 via the series connection of a potentiometer 13 and a resistance 14, the other input of said operation amplifier being connected by a terminal 15 to a bias voltage.

The output of the integrator 4, 5, connected to terminal 2, is also joined to the second input 7 of the comparator 3 by a filtering network 16, 17, 18.

The comparator 3 permits fast voltage comparisons and the detection of a small difference between two voltages. It can be one of the types known commercially by the names FAIRCHILD A 710, NATIONAL SEMICONDUCTOR LM 119, LM 311 or LM 319 and being made in the form of integrated circuits.

Figure 4:
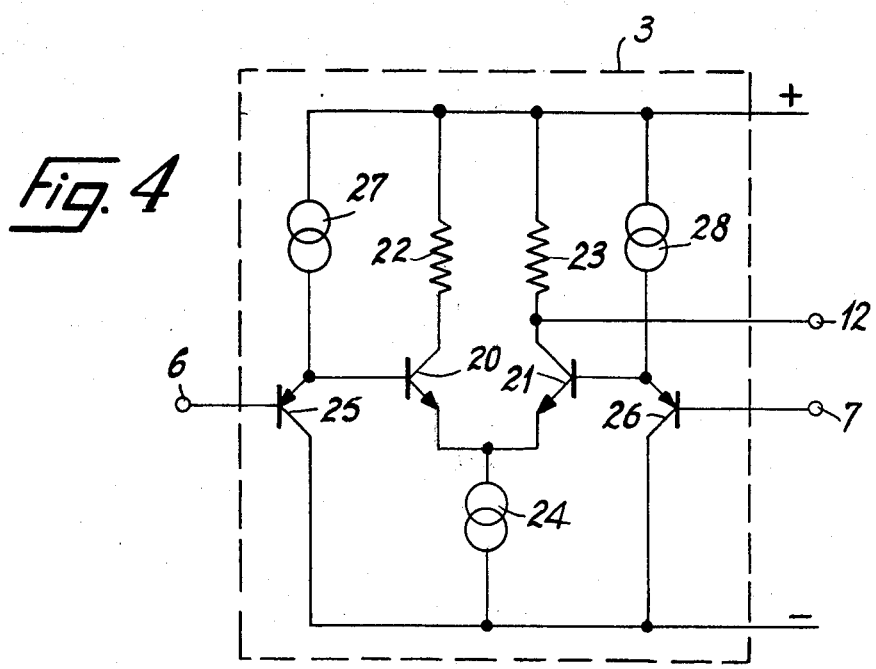
FIG. 4 shows a simplified diagram of a comparator for the generator of FIG. 2.

FIG. 4 shows a simplified diagram of such a comparator. It comprises two identical transistors 20 and 21 of the NPN type whose collectors are connected to the positive terminal of a voltage source via identical resistances 22 and 23, respectively. The output terminal 12 of the comparator is connected to one of the collectors of said transistors. The emitters of the latter are joined to the negative terminal of said voltage source by a generator 24 of constant current depending on temperature. To each of the transistors 20 and 21 is associated an emitter-follower-connected transistor 25 or 26, respectively. The bases of transistors 20 and 21 are connected respectively to the emitters of transistors 25 and 26, while the inputs 6 and 7 are connected respectively to the bases of transistors 25 and 26. Temperature-dependent constant-current generators 27 and 28 are mounted in the emitter-collector paths of transistors 25 and 26, respectively. The transistors 25 and 26 make it possible in a known manner to reduce the current consumption and to match the impedance of the circuits of inputs 6 and 7.

When none of the voltage square pulses c is sent to the terminal 1, the gate P blocks the regulated-voltage source S and the potential difference at the terminals of the resistive bridge 10, 11 is zero. Consequently, the input 6 of the comparator 3 is itself at zero potential, which reflects back on the output 2 which is situated at ground potential.

On the other hand, when a voltage square pulse c is sent to terminal 1, the gate P unblocks the regulated-voltage source S which establishes a regulated potential difference at the terminals of the resistive bridge 10, 11. A portion of said potential difference is extracted at 9 and transmitted to the comparator 3 which in turn transmits it to the integrator 4, 5 which integrates it with the time constant formed by the potentiometer 13, resistance 14 and capacitor 5. A portion of the integrated voltage appearing at terminal 2 is brought back to the input 7 of the comparator 3 after filtering by the filter 16, 17, 18. The error voltage appearing then at the output terminal 12 is likewise integrated and then appears at terminal 2. Consequently, the voltage at that terminal 2 follows the variation of the potential at point 9, i.e. the voltage in the resistive bridge 10, 11.

The result is that the ascending and descending variations of the voltages of establishment and disappearance in the resistive bridge 10, 11 are transformed at 2 into ascending and descending oblique ramps, respectively, while the equilibrium plateaus of this voltage give rise to plateaus of constant amplitude A at terminal 2. By varying the duration and the number of the square pulses c, either the signal of FIG. 3a or those of FIGS. 3b and 3c is obtained at terminal 2.

The potentiometer 13 makes it possible to regulate the integration constant of the integrator 13, 14, 4, 5, e.g. between 5 and 400 ms (and thus the slope of the ascending and descending ramps of the signal at terminal 2) while a potentiometer 19 coupled to the source S can be provided to vary the amplitude A.

What is claimed is:

1. Reference-signal generator, particularly for the control of a direct-current motor, comprising a regulated-voltage source supplying on of two inputs of a comparator via a resistive bridge, the output of said comparator connected by resistive means to an integrator-connected operational amplifier, the output of said amplifier being connected to the other input of said comparator.

2. Generator according to claim 1, characterized in that the resistive means of connection between the comparator and the operational amplifier comprise at least one potentiometer capable of varying the integration constant of the integrator formed by said resistive means and a capacitor associated with said operational amplifier.

3. Generator according to claim 1, characterized in that the resistive bridge arranged between the regulatedvoltage source and the comparator comprises a variable element to modify the amplitude of the plateaus of the generator's output signals.

4. Generator according to claim 1, characterized in that a filter is arranged in the connection between the output of the operational amplifier and the other input of the comparator.

5. Generator according to claim 1, characterized in that the comparator is of the two-channel transistorized differential amplifier type in which the emitter-collector paths comprise a constant-current generator.

6. Generator according to claim 5, characterized in that the comparator comprises two emitter-follower-connected transistorized input stages each associated with one of said channels, with a constant-current generator being mounted in the emitter-collector path of each of said transistors of said input stages.

7. Reference signal generator, particularly for the control of a direct current motor, comprising:

a regulated-voltage source of the pulse-controlled type;

a resistive bridge connected to the output of said regulated-voltage source and comprising a variable element to modify the amplitude of the plateaus of the generator's output signal;

a two-channel transistorized differential amplifier type comparator with one of its inputs connected to the midpoint of said resistive bridge, wherein the emitter-collector paths comprise a constant-current generator, and further comprising two emitter-follower-connected transistorized input stages each associated with one of said channels, with a constant-current generator being mounted in the emitter-collector path of each of said transistors of said input stages;

an integrator-connected operational amplifier with a shunting capacitor associated therewith;

resistive means connecting the output of said comparator with the input of said operational amplifier comprising at least one potentiometer capable of varying the integration constant of the integrator formed by said resistive means and said shunting capacitor; and means to connect the output of said operational amplifier to the other input of said comparator comprising a filter.

* * * * *

UNITED STATES PATENT OFFICE
CERTIFICATE OF CORRECTION

PATENT NO. : 3,909,734
DATED : September 30, 1975
INVENTOR(S) : Gaston Albert Palombo et al.

It is certified that error appears in the above-identified patent and that said Letters Patent are hereby corrected as shown below:

Claim 1, line 34, delete "on" and substitute therefore --one--.

Claim 3, line 51, change "signals" to --signal--.

Signed and Sealed this sixth Day of January 1976

[SEAL]

Attest:

RUTH C. MASON
Attesting Officer

C. MARSHALL DANN
Commissioner of Patents and Trademarks